United States Patent
Paxton et al.

(10) Patent No.: US 6,936,140 B2
(45) Date of Patent: Aug. 30, 2005

(54) WATER DISTILLATION SYSTEM

(75) Inventors: Gregory Mark Paxton, Queensland (AU); Patrick Joseph Glynn, Queensland (AU)

(73) Assignee: Aqua Dyne, Inc., Newport Beach, CA (US)

(*) Notice: Subject to any disclaimer, the term of this patent is extended or adjusted under 35 U.S.C. 154(b) by 254 days.

(21) Appl. No.: 10/182,905

(22) PCT Filed: Feb. 2, 2001

(86) PCT No.: PCT/AU01/00095

§ 371 (c)(1),
(2), (4) Date: Aug. 2, 2002

(87) PCT Pub. No.: WO01/56934

PCT Pub. Date: Aug. 9, 2001

(65) Prior Publication Data

US 2003/0089590 A1 May 15, 2003

(30) Foreign Application Priority Data

Feb. 2, 2000 (AU) .............................. PQ5402

(51) Int. Cl.[7] .............................. B01D 3/06; B01D 3/10; B01D 3/42; C02F 1/06; C02F 1/16
(52) U.S. Cl. .......................... 202/160; 159/2.1; 159/44; 159/901; 202/176; 202/205; 203/1; 203/2; 203/11; 203/22; 203/88; 203/94; 203/98
(58) Field of Search ................................ 202/160, 176, 202/205; 203/1–2, 11, 94, DIG. 8, 22, 27, 88, 91, 98, 10; 159/2.1, 44, 901; 60/320; 165/48.1, 51

(56) References Cited

U.S. PATENT DOCUMENTS

| | | | | |
|---|---|---|---|---|
| 2,389,789 A | * | 11/1945 | Latham, Jr. ..................... 203/2 |
| 3,489,652 A | * | 1/1970 | Williamson ................... 203/11 |
| 3,607,668 A | * | 9/1971 | Williamson ................... 203/11 |
| 3,871,968 A | * | 3/1975 | Wood et al. ................. 202/173 |
| 4,186,058 A | | 1/1980 | Katz et al. |
| 4,227,373 A | | 10/1980 | Amend et al. |
| 4,267,022 A | | 5/1981 | Pitcher |
| 4,420,373 A | * | 12/1983 | Egosi .......................... 202/173 |
| 5,198,076 A | * | 3/1993 | Borgren ....................... 202/202 |
| 5,248,387 A | * | 9/1993 | Hansen ....................... 159/48.1 |
| 5,853,549 A | | 12/1998 | Sephton |
| 6,350,351 B1 | * | 2/2002 | Popov et al. ................ 202/205 |
| 6,740,205 B2 | * | 5/2004 | Molintas ...................... 202/176 |

FOREIGN PATENT DOCUMENTS

DE    3429017 A1    2/1986

* cited by examiner

Primary Examiner—Virginia Manoharan
(74) Attorney, Agent, or Firm—Young & Thompson

(57) ABSTRACT

A distillation system is provided for recovering water from sea water and other polluted water source. The system has a heat engine embodying Carnot cycle and a Rankine cycle formed by heat exchangers, flash evaporator and condenser. Burnt gases from the engine such as a jet engine no longer fit for flying are directed into a duct where the exchangers are located. Sea water is pumped into the heat exchanger for preheating by residue heat in the duct and then into the exchanger for further heating. A recirculating pump raises water pressure in the exchanger for increasing boiling point to about 165° C. The heated water is fed into the evaporator where it changes into vapour and condensed into water by the condenser. The jet air stream is used to create Venturi effect for maintaining sub-atmospheric pressure in the evaporator. Any solid left in the evaporator is removed by a transfer mechanism.

12 Claims, 2 Drawing Sheets

WATER DISTILLATION SYSTEM

FIELD OF THE INVENTION

THIS INVENTION relates to the recovery of potable water from sea water or any organically or mineral polluted water source using a heat source from a heat generating apparatus such as a gas turbine jet engine. The invention can also be used to recover water from air used in the heating and combustion process.

BACKGROUND TO THE INVENTION

Methods for sea water de-salination have been proposed in a number of different technologies. Two major methods are described here as examples:

Distillation Method

One form of this method involves raising the temperature of sea water at atmospheric pressure above 100° C. to produce steam. The steam is then distilled using either ambient air or water as the cooling medium to condense the steam back to pure water. This method has the following advantages:

1. Most bacteria are killed off as the water temperatures are above 65° C.;
2. Systems are easily monitored due to visible boiling taking place;
3. Principal of operation is easy to comprehend so little personnel training is needed;
4. Total Dissolved Solids (TDS) of <10 ppm are left in the distilled water.

However this method also has a number of disadvantages including:

1. Very inefficient as indirect methods to heat the sea water are typically used;
2. At high temperatures any solids in the sea water will congeal. The congealed solids are deposited on the surface of the heat exchanger causing further reduction in efficiency.

Another form of this method of distilling sea water is to reduce the temperature of the boiling point of water by lowering the pressure in the distillation chamber. This method is favoured on ships due to its lower energy consumption. The major drawback with this system is that the distillation temperature is too low to kill bacteria and ultra violet lamp generated ozone is usually needed to kill bacteria in the distilled water. It is also not suitable for large scale applications due to the difficulty of maintaining the distillation chamber at below atmospheric pressures.

Reverse Osmosis

Reverse osmosis (R.O.) is a filtration system that uses a membrane to remove ionic, organic and suspended solids from a water supply. Unlike conventional filtration, a membrane system separates the feed water into two streams, a permeate stream and a concentrate stream. The permeate stream is the water that passes through the semi-permeable membrane, while the concentrate stream is the part of the feed stream that is used to flush the concentrated solids from the system.

A pump is used to feed water to membrane housings of the membrane system. The direction of the water flow is indicated by an arrow on each individual housing. Water is separated by the membrane within the housing and leaves the membrane housing in two streams as permeate and concentrate.

The permeate is collected at the permeate manifold for systems where more than one membrane housing is used. One permeate line per membrane housing is useful. A pressure relief valve or a pressure switch is usually installed to protect the system against permeate stream over-pressurisation. The permeate then flows through a flow meter and to the outlet point of the machine.

The concentrate leaves the last membrane housing and is split into two streams, the concentrate and the recycle, each with its own adjustable flow control valve. The concentrate valve has three functions namely: controlling the pressure within the machine, controlling the amount of concentrate flowing to the drain, and assisting in controlling the system recovery. A recycle valve channels a predetermined amount of concentrate into the pump inlet to achieve more turbulent cross flow.

The membrane will perform differently at varying pressures and will reject mono and polyvalent ions at a different rate or effectiveness.

This method relies very much on the efficiency of the pumps that drive the R.O. system and by their nature pumps are very inefficient users of energy.

SUMMARY OF THE INVENTION

In one form, although it need not be the only or indeed the broadest form, the invention resides in a method of using a heat generating engine such as no longer serviceable for flight gas turbine jet engines to produce distilled potable water in large quantities at efficiencies approaching 90% of the gross calorific value of the fuel used in the gas turbine heat engine process.

The process involves the utilisation of the Carnot heat engine efficiency cycle as embodied in the gas turbine jet engine and also the utilisation of the Rankine cycle in the efficient distillation and source water pre-heating during the process.

In one aspect the invention provides a water distillation system comprising a feed water means arranged to supply feed water to heat exchange means, a heat generating engine arranged to supply a stream of hot fluid to the heat exchange means for heating the feed water in the heat exchange means, a water flash evaporator arranged to receive the heated feed water from the heat exchange means, and a condenser arranged to receive vapour formed from the heated feed water in the evaporator and to convert the vapour into water.

The heat exchange means may include an insulated duct provided with a number of finned carbon steel tubes arranged across the duct. The stream of hot fluid is arranged to flow into the duct and the feed water is arranged to flow through the tubes.

In a preferred form the heat generating engine is a jet engine arranged to supply a stream of hot fluid in the form of a gas to the heat exchange means and the gas stream is arranged to induce a partial vacuum in the flash evaporator.

In another preferred form the heat generating engine is a fuel gas burner with regenerative heating path for the stream of hot fluid in the form of a fuel gas. In this form the burner may have a water jacket.

It is also preferred that the heat exchange means includes a first heat exchanger arranged down stream to said engine, and a second heat exchanger arranged down stream to said first heat exchanger to receive residual heat from the hot fluid, and a pump arranged to increase the feed pressure in the first heat exchanger in order to increase the extraction of sensible and latent heat from the first heat exchanger.

It is further preferred that the evaporator has a solids transfer means. The transfer means may operate intermittently in order to preserve the vacuum. The transfer means may comprise a revolving chamber with a counterflow of drying air.

Instead the transfer means may be a dewatering screw in a barrel which squeezes water from paste in the barrel.

Where possible the engine is adapted to consume a hydrocarbon gas which may be locally produced, e.g. methane from mining operations or a pipeline gas such as ethylene or a liquid hydrocarbon, e.g. kerosene. For some applications the gas may be hydrogen from electrolysed water. The heat generating engine is there to enable the Carnot cycle to supply the requisite heat and the principles of that cycle apply. Thus a furnace or boiler is useful but for large outputs a used jet engine is preferred as it has a heat output of the appropriate order and is economical to install.

Where the heat generating engine is a gas turbine jet engine, it is preferably a turbo fan type with a large percentage of bypass air. The hot exhaust from the jet engine is directed through an insulated duct provided with a number of finned carbon steel tubes arranged across the duct. As the hot exhaust gas (>650° C.) passes through the heat exchange means, feed water in the form of sea water or other source water in the tubes is heated under pressure to a predetermined temperature above the predetermined boiling point of the feed water.

The heated water is then released through a nozzle into the evaporator in the form of a flash distillation chamber. This flash distillation chamber is maintained at a vacuum pressure that allows the feed water to flash boil at 60° C.

The second heat exchanger is used to preheat the feed water before the relatively high temperature first heat exchanger. To avoid the build up of mineral deposits in the heat exchanger tubes a pump may be used to re-circulate the water at high velocities through the high temperature heat exchanger ensuring that the temperature rise of the water is no more than 2° C. at each pass of the water. This will ensure that there will be the minimum build-up of solid lining in the heat exchanger water tubes.

Feed water is normally drawn into the heat exchange means by a pump that is controlled by a Digital Control System (DCS) using a Variable Frequency Drive (VFD) to dynamically control the temperature, flow and pressure of the process utilising Proportional and Integral, Differential (P and ID) control. This allows the automation of the whole system without any intervention at all or with only little intervention, save for maintenance.

The incoming feed water can be directed into the preheat second heat exchanger before going through the high temperature first heat exchanger.

The incoming water may also be used to cool and condense the steam vapour coming from the evaporator or vacuum flash distillation chamber within the second heat exchanger whilst allowing a heat transfer to the incoming feed water.

The system will generate large amounts of heat and accordingly all high temperature areas may be insulated using Micropore (TM) insulation. The low temperature surface areas can be insulated with polystyrene foam and aluminium foil.

The expected output of potable water from this invention can be calculated as follows:

Taking a jet engine with an equivalent horse power (EHP) of 4442:

EHP to Kilowatts (Kw)=HP×0.746

Kw to Joules (J)=Kw×3600×1000

Energy to raise water to 100° C.=T2 (Water output temperature)−T1 (Water input temperature)×Weight of water=Joules Therefore 4442×0.746×1000×3600=11,929,435,200 Joules output of jet engine.

Quantity of water raised to 100° C.

1 Kg water×4.2×1000 (Specific Heat Capacity of water)×30° C. (expected temperature difference between input water and output water)=126,000 Joules.

To this must be added the quantity of heat needed to change water to steam=2,089,000 Joules Therefore 11,929,435,200 divided by 2,215,000=5,385 Kg distilled water in the first hour.

The fuel cost per Kg of distilled water produced=cost of fuel input to the jet engine divided by the amount of water produced.

There is approximately 45,000,000 Joules per liter of Kerosene, this is divided into the output of the jet engine which is 11,929,435,200 Joules=265 Liters of Kerosene per hour. This is multiplied by $0.22 per liter and divided by 5,385 Kg of water produced=265×0.22 divided by 5,385= $0.011 per liter of water. This represents a 100% heat loss situation, if we then apply a 95% heat recovery calculation the cost per liter becomes ($0.011 divided by 100)×5= 0.00055 c per liter.

BRIEF DESCRIPTION OF THE DRAWINGS

In order that the present invention can be clearly understood and put into practical effect the description will now refer to the drawings which show non-limiting embodiments of the invention, wherein.

DETAILED DESCRIPTION OF THE DRAWINGS

Figure 1:
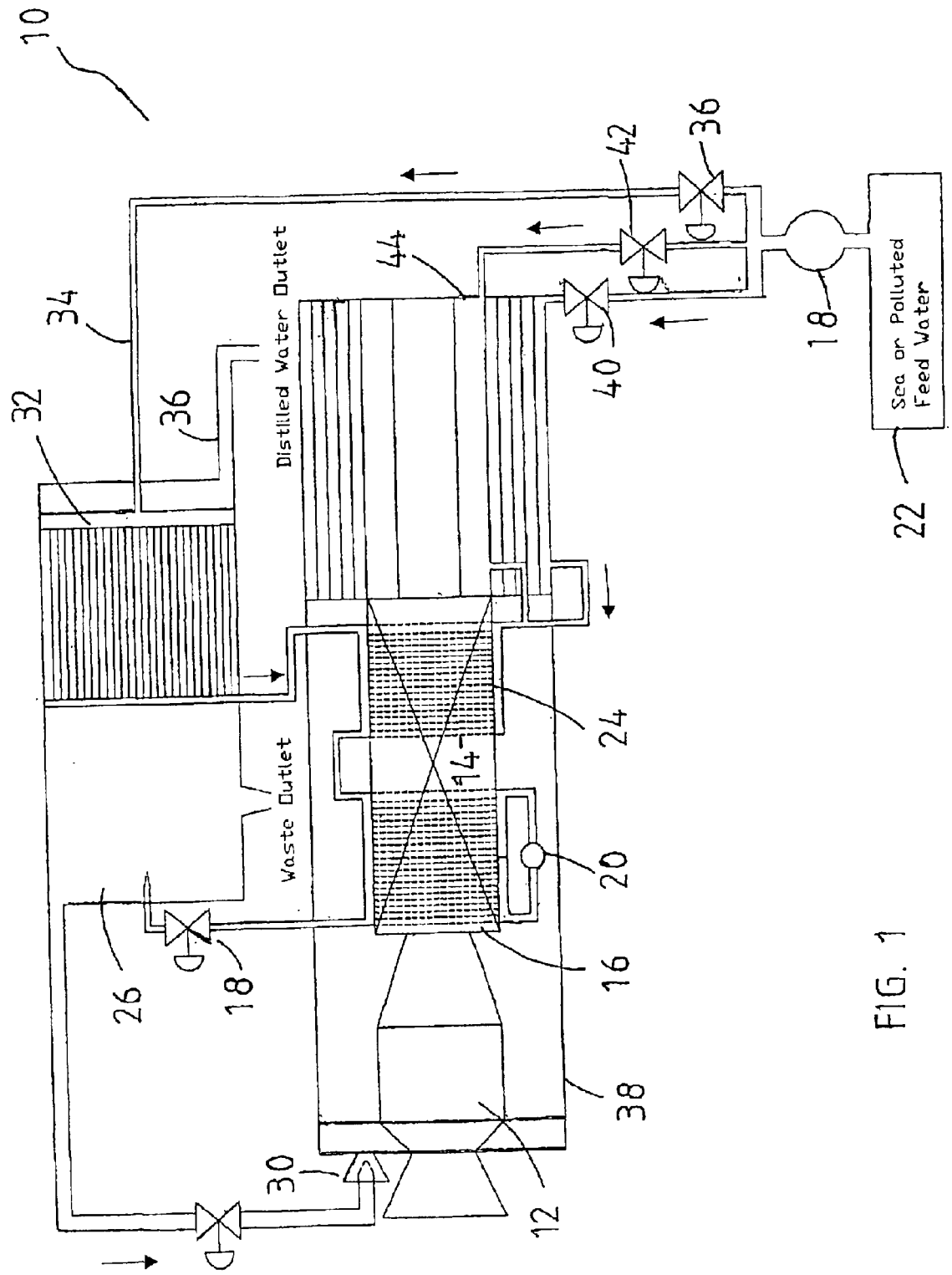
FIG. 1 is a schematic diagram of the system according to one embodiment of the present invention.

In the a water distillation system 10 shown in FIG. 1, the heat generating engine 12 is an RB 211 aircraft engine and kerosene is used as fuel source for this engine 12. When such motors have exceeded manufacturer's recommended flying hours, they are still useful as heat engines in large volume distillation processes namely of the order of 40–50k l/hour. The motor is adjusted to operate as a heat engine rather than to provide thrust. Operating under steady conditions and using kerosene as fuel, an engine temperature of 1150° C. is attainable. The exhaust discharges into a horizontal duct 14 where the burnt gases at about 650° C. impinge on the stainless steel cross tubes of a primary heat exchanger 16. These tubes are supplied with circulating feed water by a pump 18. A recirculating pump 20 raises the pressure of the water in order to raise the boiling point. The water temperature rises to about 165° C.

Pump 18 supplies constant feed water from a sea water tank 22. Sea water contains about 35 g/l solids. The solids remain in solution when warmed from ambient storage temperature as the feed water passes through a secondary heat exchanger 24 which has finned cross pipes made of carbon steel.

Figure 2:
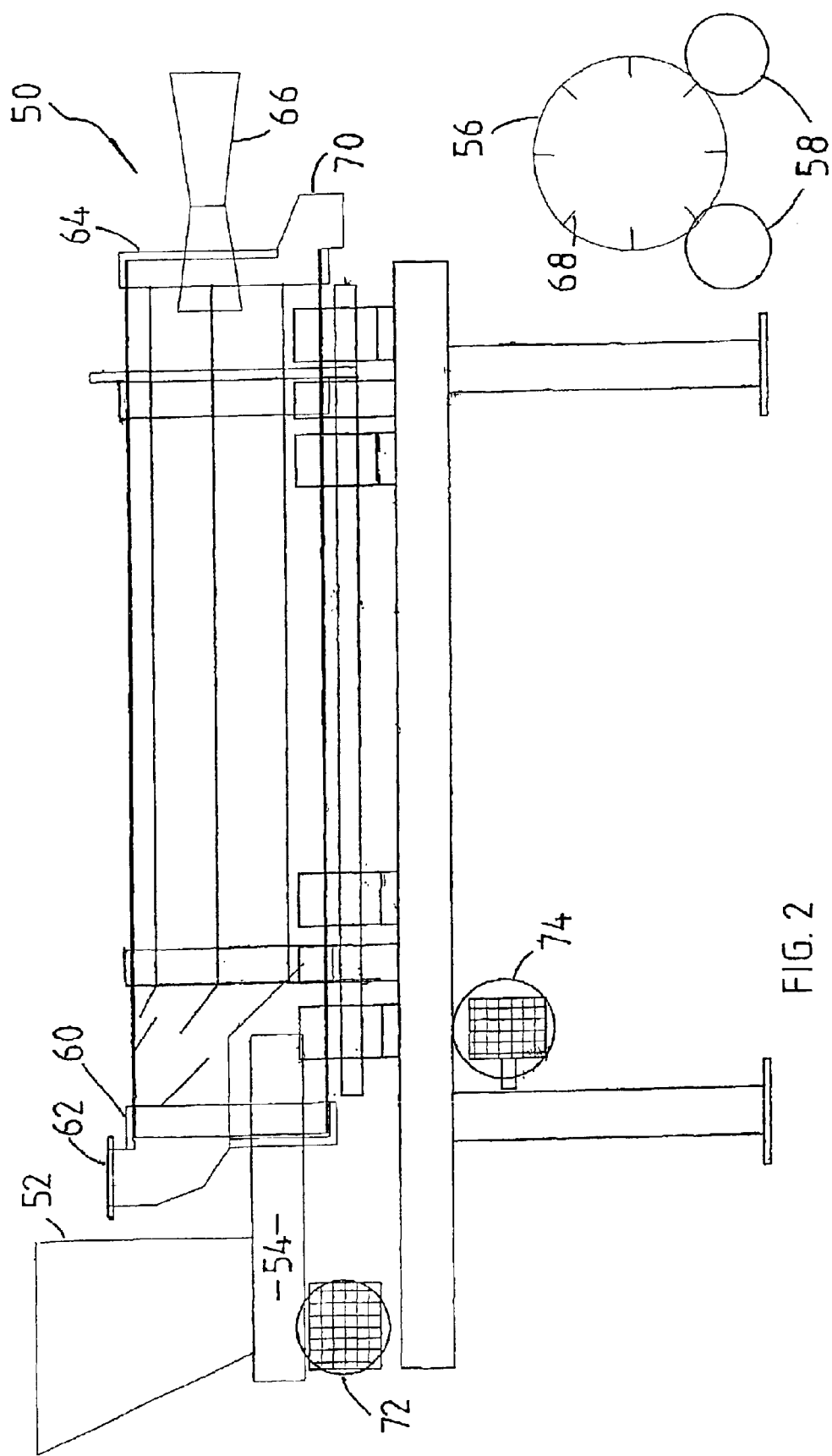
FIG. 2 is a schematic diagram of an embodiment of the solids treatment mill for the system shown in FIG. 1.

Recirculating pump 20 increases the pressure of the feed water in the primary exchanger which leaves the exchanger and is released as a spray into the vacuum evaporator 26. Hot water flow is controlled by valve 28. The evaporator 26 is maintained at sub-atmospheric pressure by connection to the venturi 30 utilising the air stream of the engine 12. As the hot feed water is released into the evaporator 26 the water vaporises, expands adiabatically and cools. The low pressure permits the feed water to boil at about 60° C. so the evaporator 26 acts as a spray dryer and the solids fall out of the vapour into the bottom of the vessel 26 where they collect in the solids treatment section 50 (See FIG. 2).

The water vapour in the vessel 26 reaches a condenser 32 which is cooled by the incoming feed water through pipe 34 on its way to the secondary heat exchanger 24. Distilled water discharged through pipe 36 is drawn from the vessel 26.

The engine 12 and the heat exchangers 16 and 24 are enclosed in an insulated housing 38. Valves 40, 42 are used to adjust the feed water to a pre-heating exchanger 44 which supplies water to the secondary exchanger 24. Valve 36 adjusts the flow of cooling water through the pipe 34.

Solids from the evaporator 26 enter collector 52 as paste. The paste is fed by auger 54 to the interior of horizontal barrel 56 (300 mm dia.) which rotates on a pair of rolls 58. The feed end is closed by a cover 60 which contains a port 62 connecting the barrel interior to the evaporator 26. The discharge end is enclosed by a cover 64 which admits a desiccating counterflow of hot air from the engine 12 via an injector 66 with vortex rifling directed oppositely to the direction of barrel rotation (4 rpm) Longitudinal bar lifters 68 are welded to the barrel 56 to distribute the paste. The solids leave the barrel 56 through port 70. Equivalent mechanical dewatering treatments of the paste are useable.

A reduction drive assembly 72 with a variable speed motor controlled at 3 RPM is used to drive the auger feed 54. Another reduction drive assembly 74 with a variable speed motor controlled at 4 RPM is used to drive the rolls 58.

Whilst the above has been given by way of illustrative example of the present invention many variations and modifications thereto will be apparent to those skilled in the art without departing from the broad ambit and scope of the invention as herein set forth.

What is claimed is:

1. A water distillation system comprising feed water means arranged to supply feed water to heat exchange means, a heat generating engine arranged to supply a stream of hot fluid to the heat exchange means for heating the feed water in the heat exchange means, a water flash evaporator arranged to receive the heated feed water from the heat exchange means for evaporating the heated water, and a condenser arranged to receive vapor formed from the heated feed water in the evaporator and to convert the vapor into water, wherein the heat generating engine is a jet engine arranged to supply a stream of hot fluid in the form of a gas to the heat exchange means and further comprising air extraction means arranged so that the gas stream is induced to create a partial vacuum in the flash evaporator, a pump for drawing the feed water into the heat exchange means and control means being arranged to dynamically control the temperature, flow and pressure of the water.

2. The system according to claim 1 further comprising water recirculating means arranged for raising pressure in the heat exchange means by recirculating water therein at a predetermined flow rate.

3. The system according to claim 2 wherein the heat exchange means includes a first heat exchanger arranged down stream to said engine, and a second heat exchanger arranged down stream to said first heat exchanger to receive residual heat from the hot fluid, and the water recirculating means including a second pump arranged to increase the feed pressure in the first heat exchanger in order to increase extraction of sensible and latent heat from the first heat exchanger.

4. The system according to claim 3 wherein the second heat exchanger is used to preheat the feed water before the first heat exchanger and the second pump is used to re-circulate the water at high velocities through the first heat exchanger ensuring that the temperature rise of the water is no more than 2° C. at each pass of the water, thereby reducing any build-up of solid lining in the heat exchanger means.

5. The system according to claim 3 wherein the incoming feed water is directed into the second heat exchanger for preheating before going through the first heat exchanger, and the incoming water is used to cool and condense the steam vapor within the second heat exchanger while allowing a heat transfer to the incoming feed water.

6. The system according to claim 1 wherein the jet engine includes a fuel gas burner with a regenerative heating path for the stream of hot fluid in the form of a fuel gas.

7. The system according to claim 1 wherein the heat exchange means including an insulated duct provided with a number of finned carbon steel tubes arranged across the duct, the stream of hot fluid being arranged to flow into the duct and the feed water being arranged to flow through the tubes.

8. The system according to claim 1 further comprising solids transfer means associated with the evaporator for transferring from the evaporator any solid resulting from evaporation of the heated feed water.

9. The system according to claim 8 wherein the transfer means is arranged to operate intermittently in order to preserve vacuum state at the evaporator.

10. The system according to claim 8 wherein the transfer means including a revolving chamber with a counterflow of drying air.

11. The system according to claim 8 wherein the transfer means including a dewatering screw in a barrel which squeezes water from paste in the barrel.

12. The system according to claim 1 wherein the jet engine is a turbo fan type gas turbine jet engine with a large percentage of bypass air, the hot exhaust from the jet engine being directed through an insulated duct provided with the heat exchange means having a number of finned carbon steel tubes arranged across the duct, and the system is arranged so that as the hot exhaust gas (>650° C.) passes through the heat exchange means, feed water in the form of sea water or other source water in the tubes is heated under pressure to a predetermined temperature above the predetermined boiling point of the feed water, and the heated water is then released through a nozzle into the evaporator in the form of a flash distillation chamber maintained at a vacuum pressure that allows the feed water to flash boil at 60° C.

* * * * *